UNITED STATES PATENT OFFICE.

DANIEL JEWETT DAVIES, OF PASADENA, CALIFORNIA.

WATERPROOFING COMPOSITION.

1,329,162.  Specification of Letters Patent.  Patented Jan. 27, 1920.

No Drawing.  Application filed May 8, 1918. Serial No. 233,359.

*To all whom it may concern:*

Be it known that I, DANIEL J. DAVIES, a citizen of the United States, residing at the city of Pasadena, county of Los Angeles, State of California, have invented a new and useful Waterproofing Composition, of which the following is a specification.

The object of my invention is the production of a waterproofing composition to be applied to leather, particularly shoes and boots, to render the same waterproof.

My composition consists of neat's-foot oil, rubber, tallow, preferably mutton tallow, beeswax, resin and Burgundy pitch. In preparing the composition, I prefer to use the ingredients in about the following proportions—viz: one gallon neat's-foot oil, eight pounds of rubber, one pound mutton tallow, eight ounces of beeswax, four ounces resin, and one ounce of Burgundy pitch. The ingredients are mixed and dissolved by a gentle heat, preferably in a double boiler.

When the composition is to be applied to a black surface I prefer to add one pound of ivory black to the composition and use gray rubber. When the composition is to be applied to tan surfaces, I prefer to use red rubber.

The composition may be applied to the leather either when heated or when cool and may be applied with a brush or any other suitable device and one or more coats applied as required. I am able to water proof leather by the use of rubber and neat's-foot oil, but the composition is not as satisfactory as when the other ingredients are used. I use one gallon of oil to eight pounds of rubber.

I claim:

1. A waterproofing composition compound of neat's-foot oil, one gallon, and eight pounds of rubber.

2. A waterproofing composition comprising one gallon neat's-foot oil, eight pounds rubber, one pound tallow, eight ounces beeswax, four ounces resin, and one ounce Burgundy pitch.

In witness that I claim the foregoing I have hereunto subscribed my name this 2nd day of May, 1918.

DANIEL JEWETT DAVIES.